(12) United States Patent
Ziegahn et al.

(10) Patent No.: US 7,814,812 B1
(45) Date of Patent: Oct. 19, 2010

(54) REMOVABLE NONROTATABLE HANDLEBAR GRIP ASSEMBLY

(75) Inventors: Geoffrey D. Ziegahn, Madison, WI (US); Matthew J. Poster, Madison, WI (US); Christopher R. Carlson, Madison, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 1222 days.

(21) Appl. No.: 11/058,640

(22) Filed: Feb. 15, 2005

(51) Int. Cl.
*B62K 21/26* (2006.01)
*F16B 7/10* (2006.01)
*B25G 1/10* (2006.01)

(52) U.S. Cl. .................. 74/551.9; 403/104; 16/421; 74/551.8

(58) Field of Classification Search ............. 74/551.8, 74/551.9; 16/421; 248/412, 125.8; 279/47; 188/67; 108/147.13; 403/104; 72/76
See application file for complete search history.

(56) References Cited

U.S. PATENT DOCUMENTS

| | | | | |
|---|---|---|---|---|
| 540,906 | A * | 6/1895 | Blakely ........................... 72/76 |
| 689,855 | A * | 12/1901 | Copeland ...................... 279/47 |
| 1,970,624 | A * | 8/1934 | Recker ....................... 248/412 |
| 3,964,339 | A * | 6/1976 | Antonio et al. ............. 74/551.9 |
| 4,277,197 | A * | 7/1981 | Bingham ..................... 403/104 |
| 4,416,166 | A | 11/1983 | Jannard et al. |
| 4,535,649 | A | 8/1985 | Stahel |
| 5,011,104 | A * | 4/1991 | Fang ........................ 248/125.8 |
| 5,127,342 | A * | 7/1992 | Taylor .................... 108/147.13 |
| 5,280,735 | A | 1/1994 | Kuipers et al. |
| 5,517,878 | A * | 5/1996 | Klein et al. ................. 74/551.3 |
| 5,848,453 | A * | 12/1998 | Racodon ...................... 16/431 |
| 5,950,498 | A * | 9/1999 | Gossett et al. ............. 74/551.8 |
| 6,263,759 | B1 | 7/2001 | Hollingsworth et al. |
| 6,615,687 | B2 | 9/2003 | Bendetti et al. |
| 6,681,653 | B2 * | 1/2004 | Yu ............................. 74/551.9 |
| 6,923,089 | B2 * | 8/2005 | Wu ............................ 74/551.9 |
| 7,334,499 | B2 * | 2/2008 | Lai ............................. 74/551.9 |
| 7,350,628 | B2 * | 4/2008 | Adoline et al. ................ 188/67 |
| 2003/0121359 | A1 * | 7/2003 | Pacheco ..................... 74/551.9 |

OTHER PUBLICATIONS

McGraw-Hill Dictionary of Scientific and Technical Terms, 1976, pp. 179 and 1164.*

* cited by examiner

*Primary Examiner*—Vinh T. Luong
(74) *Attorney, Agent, or Firm*—Boyle Fredrickson, S.C.

(57) ABSTRACT

A nonrotatable grip assembly for a handlebar that includes a tubular grip body, a pair of compression split rings and a pair of end caps configured to attach to the grip body. As the end caps are secured to the grip body, the compression split rings collapse and pinch against the handle bar to prevent the grip body from turning.

10 Claims, 1 Drawing Sheet

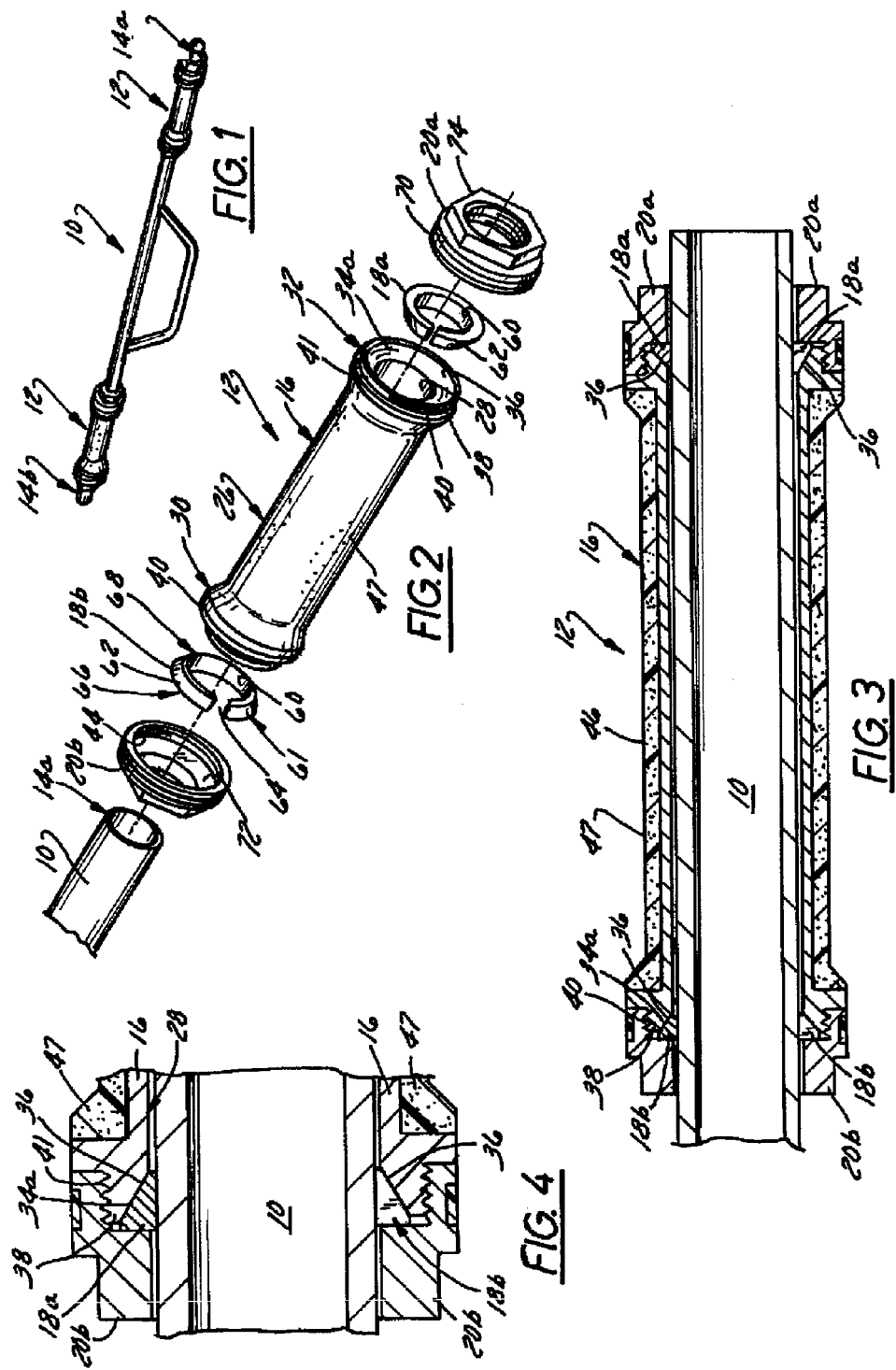

REMOVABLE NONROTATABLE HANDLEBAR GRIP ASSEMBLY

BACKGROUND OF THE INVENTION

1. Field of the Invention

The present invention relates to the field of handlebar grips. More particularly, the invention relates to handlebar grips, which are fixed to a handlebar in such a way that they do not turn or rotate during use.

2. Discussion of the Related Art

Handlebar grips are a common accessory on recreational vehicles such as bicycles, all-terrain vehicles (ATVs), watercraft and snowmobiles as well as numerous machines and tools. Handlebar grips allow a user to more comfortably control the means for steering the vehicle or machine. Handlebar grips, particularly those used on bicycles, are preferably soft on the outside so that they can be held without irritating the rider's hands over rough terrain.

The ability of the grip to be maintained in place on the handlebar is critical during the operation of the vehicle or machine. Safe operation of these devices requires the grip to be maintained in place for extended periods of time during operation. High stress forces placed upon the grip by an operator during normal operation, as well as vibration forces imparted upon the handlebar and grip during operation, can often cause the grip to turn or rotate during use. Known prior art grips, however, exhibit numerous shortcomings. For example, many grips are often difficult to securely adhere to the handlebars and as a result are prone to turning or rotation during use. Therefore, it would be advantageous for bicycles and machinery to have a handlebar grip that does not turn with respect to the handlebar.

In order to maintain grips on a handlebar without rotation, strong adhesives or fasteners such as screws have been used in prior art devices. These solutions, while solving the problem of unwanted rotation often create problems of their own. The use of such strong securing mechanisms provide for a grip, which is difficult, if not impossible to easily remove when the grip becomes worn or damaged. Therefore, it would also be advantageous to provide a grip assembly, which would not rotate during use but could also be easily removed from the handlebar.

Various grip designs have attempted to provide a securely held soft grip. One such design is shown in the Kuipers, et al. U.S. Pat. No. 5,280,735. This patent shows a two-piece slip-resistant grip, which has an outer nylon lattice-housing member with two end clamps. This lattice and end clamp assembly is placed over a softer inner sleeve, which extends through the openings in the lattice and is clamped in place by the end cap and flanged end. This grip results in the soft inner portion contacting the handlebar and with extended time the soft portion tends to form a bond with the handlebar and is very difficult to remove.

Another two-part grip is shown in U.S. Pat. No. 4,416,166 to Jannard, et al. which has a two-part grip having an outer sleeve fitted over an inner sleeve. These two parts are interlocked by their matching designs. U.S. Pat. No. 4,535,649 shows a foam surfaced handlebar grip, which has a foam sleeve, which is held over a hard polymer tube by an end cap and a coupling member.

U.S. Pat. No. 6,615,687 to Bendetti et al. and U.S. Pat. No. 6,263,759 to Hollingsworth et al. disclose removable grip assemblies. Both patents, however, include complex securing mechanisms employing screws and other fasteners. Therefore, there remains an obvious need for a nonrotatable handlebar grip that can be easily removed with minimal effort and without complex tools.

SUMMARY AND OBJECTS OF THE INVENTION

In view of the foregoing, it is an object of the present invention to provide a grip assembly that provides the desirable ergonomic and control features of prior art grip designs yet will not turn or rotate during use. It is a further object of the present invention to provide a grip assembly providing the aforementioned advantages that can be easily removed from a handlebar. It is a further object of the invention to provide a grip assembly including the above-mentioned features that uses fewer materials, provides a finished look and is more easily assembled than existing devices. Still another object of the invention is to provide a grip assembly that is economical to manufacture using existing equipment.

Consistent with the foregoing objects and in accordance with the invention as embodied and broadly described herein, a grip assembly and a method of securing a grip to a bar are disclosed in suitable detail to enable one of ordinary skill in the art to make and use the invention.

In a first embodiment, a grip assembly includes a grip body having a hollow core defining an inner surface, an outer surface, a first end and a second end. The grip body is configured to engage a compression split ring and fit over a handlebar. The grip assembly further includes at least one end cap configured to engage an outer end of the grip body. Engagement of the end cap and the grip body wedges the compression split ring between the grip body and the handle bar preventing rotation of the grip body.

In an alternative embodiment, the outer ends of the grip body include a threaded attachment lip and the end cap defines a threaded inner surface that mates with the threaded attachment lip. The cap may be in the form of a threaded locking nut and the grip body may include a compression split ring receiving recess adjacent an outer end. In yet another alternative embodiment, the grip assembly comprises an external grip secured over the grip body.

In another alternative embodiment, a method of securing a grip to a bar includes providing a grip assembly including a grip body having a hollow core defining an inner surface, an outer surface, a first end and a second end, a compression split ring configured to fit over the bar and engage the inner surface of the grip body and an end cap configured to engage an outer end of the grip body. The grip body is placed over the bar, split rings are positioned adjacent to at least one of the body ends and an end cap is secured to the grip body such that the split rings are press-fitted between the grip body and the bar. The outer ends of the grip body may include a threaded attachment lips and the end cap may include a threaded inner surface configured to mate with the threaded attachment lip. The end cap is screwed onto the grip body over the split rings. Two compression split rings may be utilized to engage opposed ends and the compression split rings may be positioned on opposed ends of the grip body prior to placing it on the bar. In yet another alternative embodiment, the method further includes the step of placing a grip over a portion of the grip body.

In another embodiment, a grip assembly for a handlebar includes a tubular grip body configured to fit over the handlebar. The grip body includes first and second ends defining threaded attachment lips. The assembly also includes first and second compression members configured to fit between the respective first and second ends of the tubular body and a pair of end caps. First and second end caps include a threaded internal surface configured to engage the threaded attachment lips such that as said end caps are screwed onto the grip body, the compression split rings collapse and pinch against the handlebar to prevent the grip body from turning. The end caps may comprise a threaded locking nut and the inner side of the attachment lips may include an angled wall defining a compression split ring receiving recess. In another alternative embodiment, the grip assembly includes an external grip attached to the grip body. The external grip may be secured to the grip body by an adhesive and include a grip enhancing design.

These, and other, aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which:

FIG. 1 is a perspective view of a handlebar incorporating the handlebar grip assembly of the present invention;

FIG. 2 is an exploded perspective view of the component parts of the handlebar grip assembly illustrated in FIG. 1;

FIG. 3 is a vertical cross-sectional view of the handlebar grip assembly taken along the longitudinal axis of the assembly illustrated FIGS. 1-2; and FIG. 4 is an enlarged partial vertical cross-sectional view of the handlebar grip assembly illustrating one engagement end of the assembly.

In describing the preferred embodiment of the invention, which is illustrated in the drawings, specific terminology will be resorted to for the sake of clarity. However, it is not intended that the invention be limited to the specific terms so selected and it is to be understood that each specific term includes all technical equivalents, which operate in a similar manner to accomplish a similar purpose. For example, the word connected or terms similar thereto are often used. They are not limited to direct connection but include connection through other elements where such connection is recognized as being equivalent by those skilled in the art.

DESCRIPTION OF PREFERRED EMBODIMENTS

Specific embodiments of the present invention will now be further described by the following, non-limiting examples which will serve to illustrate various features of significance. The examples are intended merely to facilitate an understanding of ways in which the present invention may be practiced and to further enable those of skill in the art to practice the present invention. Accordingly, the examples should not be construed as limiting the scope of the present invention.

Referring initially to FIG. 1, a handlebar 10 such as that used with a bicycle or other recreational vehicle is illustrated. Handlebar 10 is shown with the inventive grip assembly 12 attached at its opposed ends. Handlebar 10 is generally known in the art and it is understood that the inventive grip assembly 12 could be utilized with a wide variety of alternative handle bars as well as other tools and machinery that include a bar or hand gripping member.

In the illustrated embodiment, handlebar 10 is a tubular member including outer ends 14a and 14b. A pair of grip assemblies 12 are attached adjacent the handlebar outer ends 14a, 14b. Grip assembly 12 is generally comprised of a hollow grip body 16, a pair of compression split rings 18a, 18b and a pair of end caps 20a, 20b configured to attach to the grip body 16 and press fit the compression split rings 18a, 18b between the grip body and the handlebar 10, thereby preventing rotation of the grip assembly 12.

Turning now to FIGS. 2-4, the components of the grip assembly 12 are better illustrated. Grip body 16 is a rigid tubular member configured to slidably fit over handlebar 10. As used herein, the term "tubular" means any structure having a hollow core through its end-to-end axis and its cross-sectional shape can be nearly any geographic configuration, e.g. circular, rectangular, hexagonal etc. In the illustrated embodiment, grip body 16 exhibits a circular cross section. Grip body 16 includes an integral hollow core 24, an outer surface 26, inner surface 28, a first end 30 and a second end 32. It is understood that grip body 16 may be constructed from a variety of known materials. Preferably grip body is fabricated from a durable and impact resistant polymer such as glass filled polypropylene or other known plastics commonly used in the art.

The interior of the first end 30 and the second end 32 ends of the grip body 16 include first and second compression split ring receiving recesses 34a and 34b. The recesses 34a, 34b are defined by sloped inner walls 36 extending from an outer rim 38 of the first 30 and second 32 ends towards the inner surface 28 of the grip body 16. It is understood that the diameter of the compression split ring receiving recesses 34a, 34b is preferably less than the widest diameter of the compression split rings 18a, 18b in their fully compressed state, thereby accommodating the press-fit anti-slip features of the grip assembly 12, discussed in greater detail below, and further preventing the slip ring from sliding into the core 24. On the outer surface of the sloped inner wall 36 is a threaded attachment lip 40. Threaded attachment lip 40 is comprised of threads 41 configured to mate with the internal threads 44 of the end caps 20a, 20b.

Grip body 16 includes an external gripping surface generally designated 46. Gripping surface 46 may be integrally formed into the grip body 16, or alternatively, as illustrated in the preferred embodiment (FIG. 3), grip body 16 may include an additional external grip 47 attached to the gripping surface of the grip body 16. External grip 47 may be secured to the gripping surface 46 of the grip body 16 by an adhesive, screw or other known attachment means. External grip 47 may additionally include knurled or other patterns which might assist user in maintaining his hold on the grip assembly 12. The external grip 47 may be comprised from a variety of relatively soft materials. A soft elastomer such as plasticized rubber may be utilized.

As noted above, a pair of compression split rings 18a, 18b fit between the recesses 34a, 34b located at the ends 30, 32 of the grip body and the end caps 20a, 20b. In the preferred embodiment, split rings 18a, 18b are comprised of an annular wall 61 defining inner 60 and outer 62 surfaces and rearward 66 and forward 68 ends. The rings 18a, 18b further include a split or gap 64 thereby allowing the rings to be collapsed upon themselves during assembly as is known in the art. As illustrated in FIGS. 2-4, the annular wall 61 of the split rings 18a, 18b is angled in a manner such that it substantially aligns with the first 34a and second 34b compression split ring receiving recesses. Due to the angled annular wall 61, the forward end 68 of the split rings 18a, 18b has a circumference and diameter substantially less than its opposed rearward end 66. As one moves away from the forward end 68 to the rearward end 66 the circumference and the diameter of the split ring increases proportionally based to the angle of the wall. This configuration allows the forward end 68 of the split rings to fit within the first 34a and second 34b compression split ring receiving recesses, however it prevents the rearward end 66 from fitting completely within the recesses.

In its assembled form, the grip assembly 12 includes a pair of end caps 20a, 20b attached to the opposed first end 30 and second end 32 of the grip body 16. End caps 20a, 20b preferably define an outer surface 70 and an inner cavity 72. In the illustrated embodiment, end caps 20a, 20b are in the form of an annular locking nut having a hexagonal head 74. The hexagonal head 74 allows for ease of a tight attachment of the grip assembly 12 to the handlebar 10. The inner cavity 72 of the ends caps 20a, 20b is preferably threaded and configured to fit over the compression split rings 18a, 18b. The threads 44 are configured to engage the threads 41 of the attachment lip 40. As the end caps 20a, 20b are screwed onto the grip body 16, the compression split rings 18a, 18b collapse and pinch against the handle bar 10 preventing the grip body from turning. It is recognized that the end caps 20a, 20b can take a variety of configurations and need not be uniform. For example, an inner end cap could be formed as the described locking nut, and an outer end cap could have a closed external outer wall to allow for a more finished look. Numerous other alternative configurations are also within the scope of the present invention.

The present invention is also directed to a method of securing a grip assembly to a handlebar. The method preferably includes the steps of placing a first end cap 20b onto the handlebar 10, such that its inner cavity 72 will face the grip body 16 and sliding the end cap 20b down the bar a distance about equal the length of the grip body 16. A first compression split ring 18b is then placed on the handlebar 10 such that its forward end 68 will face the grip body 16. The compression split ring 18b is slid down the bar so it is adjacent the first end cap 20b. Next, the grip body 16 is positioned on the handlebar 10. Preferably, a second split ring 18a is then placed onto the handlebar such that its forward end 68 faces the grip body 16. Then, a second end cap 18a is placed onto the handlebar 10 so that its inner cavity 72 faces the grip body 16. Finally, the end caps 20a, 20b are screwed onto the grip body 16 at the attachment lip 40, such that the compression split rings 18a, 18b collapse and pinch against the handle bar 10 preventing the grip body from turning. It is understood the steps of the method can be performed in an alternative order consistent with the inventive assembly. For example, the first locking nut 20b may be screwed onto the grip body prior to placement of the second compression split ring 18a and second locking nut 20a.

As noted throughout the application, the components of grip assembly 12 can be made of various materials. With exception of the external grip 47, as described above, such materials have a rigid or semi-rigid characteristic so as to be able to endure the stresses the grip assembly 12 will be subjected to during its intended lifetime.

While the invention has been described in connection with various features and advantages, such is not intended to limit the scope of the invention to the particular form set forth, but, on the contrary, the invention is intended to cover such alternatives, modifications and equivalents as may be defined by the scope of the following claims. The grip assembly 12 and its several components can be made to various sizes as long as the relative size relationships between certain components, as discussed above, are maintained. Otherwise, generally, the type of handlebar for which the grip assembly 12 is intended and the desires/attributes of the machine or vehicle user, will dictate what the overall size of the grip body 16 is and from there the other components can be determined as would be known to one of ordinary skill in the art in combination with the teachings herein.

It is intended that the appended claims cover all such additions, modifications and rearrangements. Expedient embodiments of the present invention are differentiated by the appended claims

What is claimed is:

1. A grip assembly comprising:
    a grip body having a hollow core defining an inner surface, an outer surface, a first end and a second end, said grip body configured to fit over a bicycle handlebar;
    a first compression split ring and a second compression split ring that are each configured to fit over said bicycle handle bar and engage the inner surface of said grip body at one of the first end and the second end of the grip body so that the bicycle handlebar extends through and out of opposite sides of each of the first compression split ring and the second compression split ring;
    an end cap configured to engage the outer surface of each end of said grip body so that a threaded portion of the end cap radially overlies an inward facing tapered section of the grip body and one of the first compression split ring and the second compression split ring at each of the first end and the second end of the grip body; and
    wherein said engagement of each end cap and said grip body wedges a respective one of the first and second compression split rings between said grip body and said bicycle handle bar so that each of the first compression split ring and the second compression split ring are positioned substantially radially within the grip body and so as to rotationally and longitudinally fix a position of the first end and the second end of the grip body relative to the bicycle handlebar when the end cap is engaged with each of the respective first and second ends of the grip body.

2. The grip assembly of claim 1, wherein said ends of said grip body define an outer threaded attachment lip that overlies the inward facing tapered section and each end cap defines a threaded inner surface configured to mate with said threaded attachment lip.

3. The grip assembly of claim 2, wherein at least one of the end caps comprises a threaded locking nut.

4. The grip assembly of claim 2, wherein each inward facing tapered section of the grip body has a maximum diameter that is only slightly larger than a maximum diameter of one of the first and second compression split rings when the respective ring is fully compressed.

5. The grip assembly of claim 1, wherein the handlebar passes through at least one of the end caps.

6. The grip assembly of claim 1, further comprising a grip over a portion of the grip body.

7. A grip assembly for a bicycle handlebar comprising:
a tubular grip body configured to fit over the bicycle handlebar said grip body comprising a first end and a second end, each of the first end and the second end comprising a threaded attachment lip formed on a radially outward surface of the grip body and wherein an inner side of each attachment lip comprises an angled wall defining a compression split ring receiving recess that underlies each threaded attachment lip and is formed in a radially inward surface of the grip body proximate each of the first end and the second end;
a first end cap having a threaded internal surface that is configured to cooperate with the threaded attachment lip of the first end of the tubular grip body;
a second end cap having a threaded internal surface that is configured to cooperate with the threaded attachment lip of the second end of the tubular grip body;
a first compression member disposed between the first end of the tubular grip body and the first end cap such that the bicycle handlebar extends beyond opposite ends of the first compression member and the first compression member is configured to collapse to be received nearly entirely in the respective compression split ring receiving recess and pinch an entire inner radial surface of the first compression member against the bicycle handlebar as the first end cap is screwed onto the tubular grip body; and
a second compression member disposed between the second end of the tubular grip body and the second end cap such that the bicycle handlebar extends from opposite ends of the second compression member and the second compression member is configured to collapse to be received nearly entirely in the respective compression split ring receiving recess and pinch an entire inner radial surface of the second compression member against the bicycle handlebar as the second end cap is screwed onto the tubular grip body.

8. The grip assembly of claim 7, wherein each of the first end cap and the second end cap comprises a threaded locking nut.

9. The grip assembly of claim 7, further comprising an external grip attached to the grip body.

10. The grip assembly of claim 9, wherein said external grip is secured to said grip body by an adhesive.

\* \* \* \* \*